Figure 1:
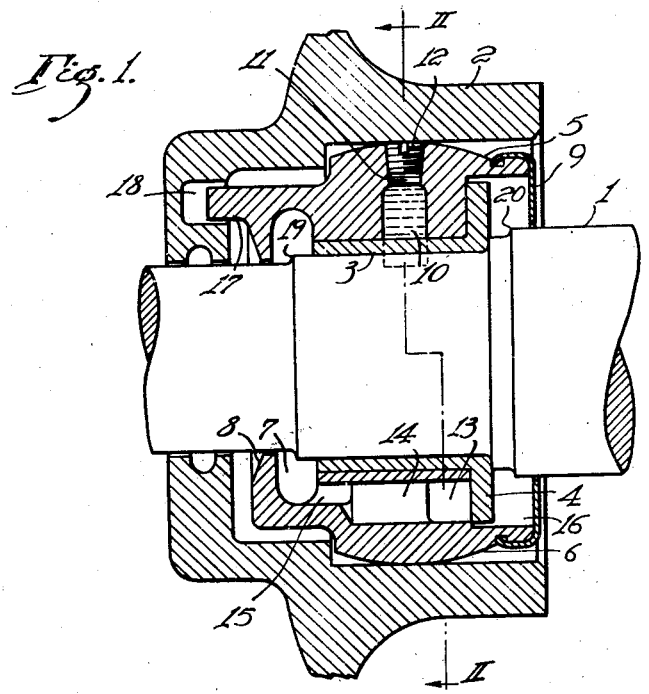

Sept. 20, 1949.    R. W. SCHUCK    2,482,518
SEALED SLEEVE BEARING
Filed Dec. 15, 1945

WITNESSES:

INVENTOR
Raymond W. Schuck.
BY O. B. Buchanan
ATTORNEY

Patented Sept. 20, 1949

2,482,518

UNITED STATES PATENT OFFICE 2,482,518

SEALED SLEEVE BEARING

Raymond W. Schuck, Pittsburgh, Pa., assignor to Westinghouse Electric Corporation, East Pittsburgh, Pa., a corporation of Pennsylvania Application December 15, 1945, Serial No. 635,354

6 Claims. (Cl. 308—132)

The present invention relates to sleeve-type bearing and, more particularly, to a prelubricated, sealed sleeve bearing.

The bearing of the present invention is a sealed sleeve-type bearing which is prelubricated with a sufficient supply of oil to last for the life of the bearing without any further addition of oil, and it is designed to be interchangeable with a prelubricated, sealed anti-friction bearing of usual or conventional design. It is highly desirable to design the bearings of electric motors in such a way that either sleeve or anti-friction bearings can be used interchangeably in the same bearing bracket. This considerably reduces the number of parts that must be stocked by the motor manufacturer, with resultant economy, and also makes it possible to readily change from one type of bearing to the other in the field.

In the present state of the art of oil-lubricated sleeve bearings, such bearings cannot be made interchangeable with ball or roller bearings if, by interchangeability, is meant that both types of bearings must have the same load-carrying capacity, as well as the same outside dimensions. In the case of bearings for electric motors, however, it is not necessary for the load-carrying capacity to be the same. This is for the reason that the shafts of electric motors are of relatively large diameter in order to have sufficient rigidity to maintain a uniform air gap in the motor, and the size of anti-friction bearings required is, therefore, determined primarily by the shaft diameter, so that these bearings usually have greater load-carrying capacity than is actually necessary.

If the load that is actually to be carried by the bearings is considered, it becomes possible to design a sleeve bearing which will be interchangeable with an anti-friction bearing, if interchangeability is defined to means that the outside dimensions of both bearings are the same, and that both bearings will have sufficient load-carrying capacity for the application in which they are to be used, even though the anti-friction bearing may actually have greater maximum load-carrying capacity than the sleeve bearing. Sealed, prelubricated bearings of both anti-friction and sleeve types are being used to an increasing extent, and a further requirement for interchangeability, therefore, is that the sealed sleeve bearing must be capable of containing a sufficient supply of oil to last for a bearing life which is substantially equal to that of the sealed anti-friction bearing with which it is to be interchangeable.

The principal object of the present invention is to provide a prelubricated, sealed, sleeve bearing which will be interchangeable with a prelubricated, sealed, anti-friction bearing of usual design, in the sense that both bearings will be suitable for the same application and will have substantially equal life.

A further object of the invention is to provide a prelubricated, sealed, sleeve-bearing assembly including a bearing of the porous metal type, which is adapted to be impregnated with oil, and in which an additional supply of oil is provided so that the bearing will be supplied with sufficient lubricant to last for a reasonable life of the bearing.

A more specific object of the invention is to provide a prelubricated, sealed, sleeve-bearing assembly in which a porous metal bearing is supported in a housing or cartridge which has an oil chamber for initially carrying a supply of oil in addition to that with which the bearing itself is initially impregnated, and in which the housing is also provided with additional oil chambers for receiving oil which has passed through the bearing with means for returning the oil to the bearing for re-use, so that the bearing is adequately lubricated throughout a reasonable bearing life.

Figure 2:
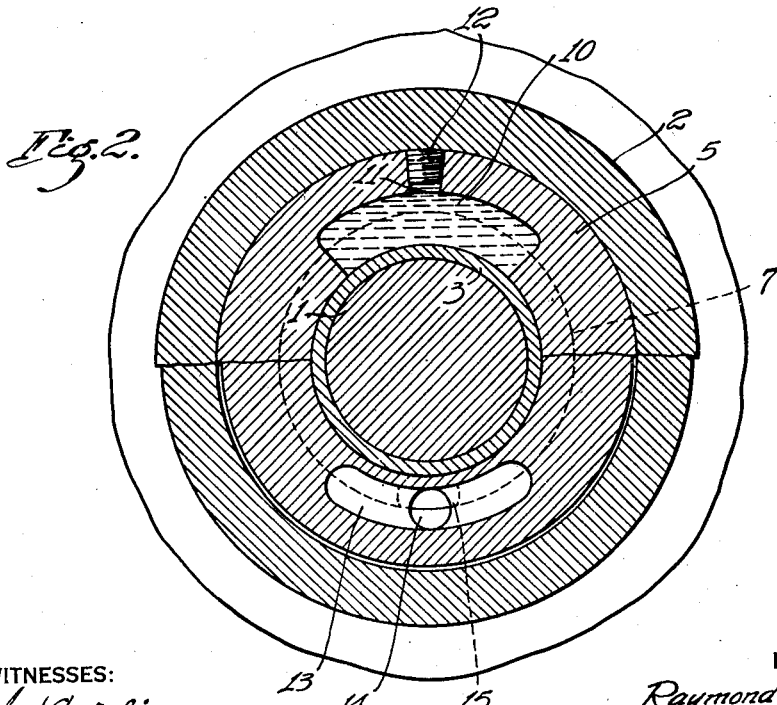

The invention will be more fully understood from the following detailed description, taken in connection with the accompanying drawing, in which:

Figure 1 is a longitudinal sectional view of a bearing assembly embodying the invention; and Fig. 2 is a transverse sectional view, approximately on the line II—II of Fig. 1.

The drawing shows a preferred embodiment of the invention, in a bearing assembly for supporting a rotatable shaft 1, which may, for example, be the shaft of an electric motor. The bearing assembly is supported in a stationary supporting structure 2 of any suitable construction which has been shown as a portion of an end bracket of an electric motor. The bearing 3 is a sleeve bearing of the porous metal type, which may, for example, be made of powdered metal formed to the desired shape under pressure and sintered to form a porous bearing. Bearings of this type are capable of absorbing oil by capillary action, and when the bearing is impregnated with oil in this way, the oil is supplied to the bearing clearance between the bearing and the shaft by reason of the heat generated between the bearing and shaft, and the wiping action of the shaft on the bearing. The bearing 3 may be made of any suitable material of this type, and it is provided at one end with a radial flange 4 of relatively large diameter, which is also made of the same bearing material.

The bearing 3 is supported in a metal housing or cartridge 5, which may be rounded, as indicated at 6, to make the bearing self-aligning. The cartridge 5 has an annular chamber 7 at one end, surrounding the shaft, and a flange portion 8 adjacent the chamber 7, forming a seal to prevent the escape of oil from the interior of the cartridge, or the entrance of dust or dirt. The other end of the cartridge 5 has an opening of sufficiently large diameter to accommodate the flange 4 of the bearing 3, and after the bearing has been put in place in the cartridge 5, the open end of the cartridge is closed by a metal sealing member 9 of any suitable type, to close that end of the bearing assembly and prevent the escape of oil or the entrance of dirt. The outside dimensions of the cartridge 5 are made the same as those of a standard anti-friction bearing of a type and size which is suitable for the same application, so that either the sleeve bearing of the present invention, or a standard anti-friction bearing, can be used interchangeably in the same bracket 2.

The cartridge 5 has an oil chamber 10 in its upper part which, as shown in Fig. 2, is generally arcuate, and is of sufficient size to hold a supply of oil which, in addition to the oil with which the bearing 3 is initially impregnated, will provide sufficient lubricant to last for the expected life of the bearing. The oil chamber 10 has an opening 11, at the top, which is closed and sealed by means of a plug 12, or in any other suitable manner, after the chamber 10 has been filled with oil. The lower side of the chamber 10 is open, so that the oil contained in it is in direct contact with the bearing 3.

The lower part of the cartridge 5 contains an arcuate oil chamber 13 adjacent the flanged end of the bearing 3. The chamber 13 is connected with the annular chamber 7 by means of a passage 14 and a small chamber 15 which adjoins the annular chamber 7. It will be apparent that oil escaping from one end of the bearing 3 will drain into the chamber 7 and flow through the passage 14 and 15 to the chamber 13, while oil escaping from the other end of the bearing 3 will drain into the chamber 16 formed in the end of the cartridge 5 by the sealing member 9. The cartridge 5 preferably has an axially extending lug 17, at one end, which is adapted to engage in a recess 18 in the bracket 2, to insure that the cartridge 5 will be properly positioned, with the oil chamber 10 at the top, when it is assembled in the bracket 2.

The porous bearing 3 is initially impregnated with oil, and the oil chamber 10 is filled with oil and sealed by means of the plug 12, or other suitable means, before the bearing is placed in service. Since the chamber 10 is sealed in this way, there is no danger of oil escaping or leaking out during handling and shipment of the bearing, or of a motor in which it is installed. When the bearing is placed in service, the oil with which the bearing 3 is initially impregnated furnishes the necessary lubrication between the shaft and the bearing, the oil escaping at the ends of the bearing into the chambers 7 and 16. Oil travelling along the shaft from the bearing without draining off is thrown off by the shoulders 19 and 20 on the shaft, and also drains into the chambers 7 and 16. As the oil with which the bearing is originally impregnated is thus used, the bearing absorbs additional oil from the chamber 10, which is intended to supply the necessary additional lubricant to the bearing.

It will be evident that, after a period of time, all of the oil which was originally in the bearing 3 and the chamber 10 will have passed through the bearing in this way and will be transferred to the chambers 7 and 16. The oil in the chamber 7, as previously explained, drains through the passages 14 and 15 into the chamber 13, so that the oil which passes through the bearing is finally received in the chambers 13 and 16. The flange 4 of the bearing 3, which is of relatively large diameter, extends into the chamber 16 and is in contact with the oil in the chambers 13 and 16. The flange 4 thus absorbs oil from these chambers and returns it to the bearing portion proper of the bearing 3, where it continues to furnish lubrication for the bearing. Thus, it will be seen that the initial supply of oil, which was at first in the bearing 3 and in the chamber 10, is eventually transferred to the chambers 13 and 16, and back to the bearing 3 through the flange 4. In this way, an adequate supply of oil is provided, in addition to that which can be carried in the bearing 3 itself, and the bearing assembly contains a sufficient amount of oil to supply lubrication throughout the life of the bearing.

It should now be apparent that a prelubricated, sealed, sleeve bearing has been provided, which can be designed to have the same dimensions as a prelubricated, sealed, anti-friction bearing of usual construction, and which is interchangeable with such a bearing in the sense previously described. The new bearing is designed to contain sufficient lubricant to have a life which is comparable to that of an anti-friction bearing intended for similar applications, and thus it is fully interchangeable with an anti-friction bearing for service in electric motors.

It is to be understood that, although a preferred embodiment of the invention has been illustrated and described, it is capable of various modifications and other embodiments, and the invention is not limited to the particular details of construction shown, but in its broadest aspects it includes all equivalent embodiments and modifications which come within the scope of the appended claims.

I claim as my invention:

1. In combination, a sleeve-type bearing for a rotatable shaft, said bearing being made of porous bearing material so as to be capable of absorbing oil, and a housing for said bearing, said housing having an oil chamber in the upper part thereof for initially holding a supply of oil in contact with the bearing to be absorbed thereby, said housing also having an oil-receiving chamber in the lower part thereof adapted to receive oil escaping from the bearing, and said bearing having a radially extending portion integral therewith and of the same material, said portion extending into said last-mentioned chamber to absorb oil therefrom.

2. In combination, a sleeve-type bearing for a rotatable shaft, said bearing being made of porous bearing material so as to be capable of absorbing oil, a housing for said bearing, said housing having an oil chamber in the upper part thereof for initially holding a supply of oil in contact with the bearing to be absorbed thereby, said housing also having an oil-receiving chamber in the lower part thereof adapted to receive oil escaping from the bearing, said bearing having a radially extending portion integral therewith and of the same material, said portion extending into said last-mentioned chamber to absorb oil therefrom, and sealing means at each end of the housing for preventing the escape of oil or the entrance of dirt.

3. In combination, a sleeve-type bearing for a rotatable shaft, said bearing being made of porous bearing material so as to be capable of absorbing oil, and a housing for said bearing, said housing having a closed oil chamber in the upper part thereof for initially holding a supply of oil in contact with the bearing to be absorbed thereby, said housing also having oil chambers in the lower part thereof adjacent each end of the bearing for receiving oil escaping from the ends of the bearing and a passage connecting said last-mentioned chambers, and said bearing having a radially extending portion integral therewith and of the same material, said portion extending into one of the last-mentioned chambers for absorbing oil therefrom.

4. In combination, a sleeve-type bearing for a rotatable shaft, said bearing being made of porous bearing material so as to be capable of absorbing oil, a housing for said bearing, said housing having a closed oil chamber in the upper part thereof for initially holding a supply of oil in contact with the bearing to be absorbed thereby, said housing also having oil chambers in the lower part thereof adjacent each end of the bearing for receiving oil escaping from the ends of the bearing and a passage connecting said last-mentioned chambers, said bearing having a radially extending portion integral therewith and of the same material, said portion extending into one of the last-mentioned chambers for absorbing oil therefrom, and sealing means at each end of the housing for preventing the escape of oil or the entrance of dirt.

5. In combination, a sleeve-type bearing for a rotatable shaft, said bearing being made of porous bearing material so as to be capable of absorbing oil, and a housing for said bearing, said housing having a closed oil chamber in the upper part thereof for initially holding a supply of oil in contact with the bearing to be absorbed thereby, said housing also having oil chambers in the lower part thereof adjacent each end of the bearing for receiving oil escaping from the ends of the bearing and a passage connecting said last-mentioned chambers, and said bearing having a radial flange at one end thereof, said flange being of large enough diameter to extend into one of the last-mentioned chambers to absorb oil therefrom.

6. In combination, a sleeve-type bearing for a rotatable shaft, said bearing being made of porous bearing material so as to be capable of absorbing oil, a housing for said bearing, said housing having a closed oil chamber in the upper part thereof for initially holding a supply of oil in contact with the bearing to be absorbed thereby, said housing also having oil chambers in the lower part thereof adjacent each end of the bearing for receiving oil escaping from the ends of the bearing and a passage connecting said last-mentioned chambers, said bearing having a radial flange at one end thereof, said flange being of large enough diameter to extend into one of the last-mentioned chambers to absorb oil therefrom, one end of said housing surrounding the shaft with a small clearance and forming a seal, and the other end of said housing having a large enough opening to receive the flange of the bearing, and sealing means closing the open end of the housing.

RAYMOND W. SCHUCK.

REFERENCES CITED

The following references are of record in the file of this patent:

UNITED STATES PATENTS

| Number | Name | Date |
|---|---|---|
| 1,568,731 | Griffin et al. | Jan. 5, 1926 |
| 2,300,754 | Whiteley | Nov. 3, 1942 |